United States Patent [19]

d'Alayer de Costemore d'Arc

[11] Patent Number: 4,553,231
[45] Date of Patent: Nov. 12, 1985

[54] MOTION DAMPING SUSPENSION SYSTEM FOR RECORD PLAYBACK MACHINES

[75] Inventor: Stéphane A. M. d'Alayer de Costemore d'Arc, Ways, Belgium

[73] Assignee: Staar S. A., Belgium

[21] Appl. No.: 608,879

[22] Filed: May 10, 1984

[30] Foreign Application Priority Data

Jun. 16, 1983 [BE] Belgium .............................. 211,016

[51] Int. Cl.[4] .................. G11B 1/00; G11B 17/00; G11B 23/00
[52] U.S. Cl. .................................. 369/263; 248/566; 248/534; 248/638; 369/247
[58] Field of Search ............... 369/247, 263; 248/566, 248/634, 638

[56] References Cited

U.S. PATENT DOCUMENTS

| 2,230,865 | 2/1941 | Hutter | 369/247 |
| 4,063,285 | 12/1977 | Nagaoka | 369/247 |

FOREIGN PATENT DOCUMENTS

| 703177 | 4/1931 | France | 369/263 |
| 450196 | 8/1949 | Italy | 369/263 |
| 1399525 | 7/1975 | United Kingdom | 369/263 |

*Primary Examiner*—Steven L. Stephan
*Attorney, Agent, or Firm*—Leydig, Voit & Mayer

[57] ABSTRACT

A suspension system provides a motion damping mounting for carrying a record playback machine comprising a plurality of damping ring assemblies, each having an elastic ring for fastening between a machine and a support, the rings being flattened when secured such that opposite segments of each ring extend substantially straight and parallel such that a component of stress applied to the machine in the direction of the straight segments produces limited rolling movement of a flattened ring, which damps motion of the playback machine in the direction of the straight segments of the flattened ring, the flattened ring also damping motion of the machine vertically and laterally relative to the direction of the straight segments. According to this invention, the damping assembly includes a ring and mounting plates or clips and fasteners for securing the ring to the machine or the support.

8 Claims, 10 Drawing Figures

MOTION DAMPING SUSPENSION SYSTEM FOR RECORD PLAYBACK MACHINES

TECHNICAL FIELD

This invention relates to suspension systems for mounting small machines and, more particularly, to suspension systems having provision for damping the motion of machines carried by the systems and absorbing stresses applied through the suspension systems from the underlying support to the machines. For example, this invention is concerned with motion damping suspension systems for machines mounted in vehicles which may turn sharply, accelerate, decelerate, or be subjected to sudden jars or impacts.

While not limited thereto, the invention has particular utility in suspension systems for mounting record playback machines having optical scanners for reading sound or music recordings in tracks of compact disc, ie.e, CD, records. Because of the small width of the tracks in such records, the scanners which employ lasers must be very precisely guided to maintain alignment with the tracks as the records are rotated at high speeds.

DISCLOSURE OF INVENTION

It is the principal object of this invention to provide suspension systems for mounting small machines, such as record playback machines, which have provision for damping the motion of such machines resulting from stresses applied due to movement of the supports for the machines.

An important object of this invention is to provide suspension systems for mounting playback machines for records of the CD type which will provide for damping motion of the machines due to applied stresses so as to minimize interference with the proper guiding of a laser beam scanner for reading information from the tracks on the records.

Another object is to provide a damping ring assembly which is constructed to facilitate being fastened in position during the manufacturing of machines.

A suspension system according to this invention provides a motion damping mounting for carrying a record playback machine comprising a plurality of damping ring assemblies, each having an elastic ring for fastening between a machine and a support, the rings being flattened when secured such that opposite segments of each ring extend substantially straight and parallel such that a component of stress applied to the machine in the direction of the straight segments produces limited rolling movement of a flattened ring, which damps motion of the playback machine in the direction of the straight segments of the flattened ring, the flattened ring also damping motion of the machine vertically and laterally relative to the direction of the straight segments.

BRIEF DESCRIPTION OF DRAWINGS

Further objects of the invention will appear from the following description taken in conjunction with the accompanying drawings, wherein.

BEST MODE FOR CARRYING OUT THE INVENTION

Figure 2:
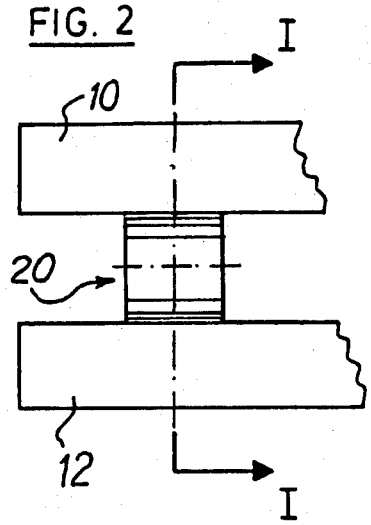
FIG. 2 is a side elevational view corresponding to FIG. 1.
Figure 1:
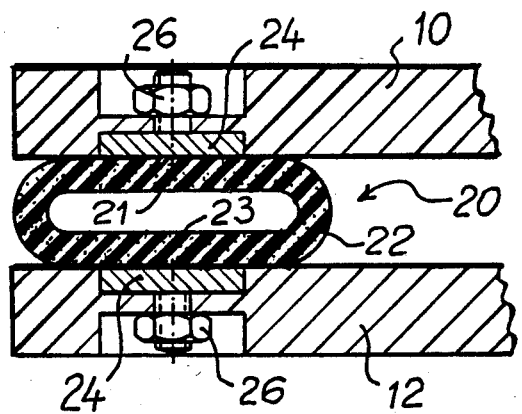
FIG. 1 is a sectional view taken substantially in the plane of lines 1—1 in FIG. 2 of a first embodiment of motion damping ring assembly of a suspension system according to the invention secured between a machine and a support.

Referring to FIGS. 1-7, a chassis member 10 is shown of a machine, such as a record playback machine 14, which is mounted on a support member 12 which may be fixed to a vehicle chassis.

According to the invention, a suspension system 20 is provided for mounting the record playback machine 14 in environments where is is subjected to stres, such as movement of the support 12, for example, for mounting the machine on a vehicle. When the vehicle accelerates or decelerates, comes to a sudden stop, or is impacted or jarred, stress is applied to the playback machine, producing motion of the machine.

In keeping with this invention, the suspension system has provision for damping motion of the machine in horizontal and vertical directions. In carrying out the invention, the motion damping is provided by a plurality of rings 22 of elastic material secured between the chassis member 10 and the support member 12 with the axis of each ring 22 arranged substantially horizontally and two opposite segments 21, 23 of each ring extending substantially straight and parallel.

To secure the rings 22, means are disclosed in this embodiment as a plate 24, of metal or plastic, for securing the opposite segments 21, 23 of each ring. One of the plates 24 is fastened to the chassis member 10 and the other to the support member 12 by fasteners 26 which are fixed to the respective plates 24 and to the rings 22.

It is preferred that the chassis member 10 and the support member 12 be provided with recesses 24a for receiving the plates 24 so that a portion of the outside surfaces of each ring 22 is held against the flat surface of the machine member and the support member.

Figure 3:
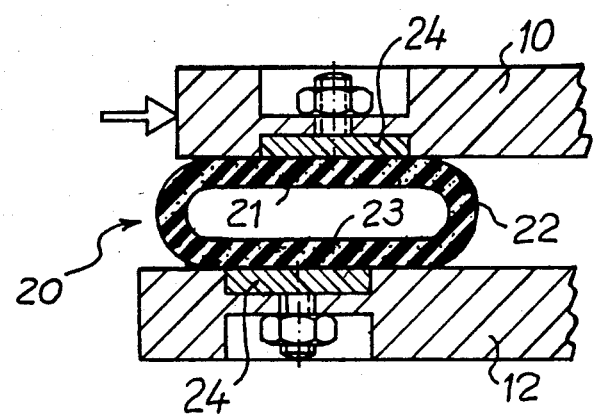
FIG. 3 is a sectional view similar to FIG. 1 illustrating deformation of the elastic ring suspension element due to stress applied in the direction of the arrow to the machine carried by the suspension system.
Figure 4:
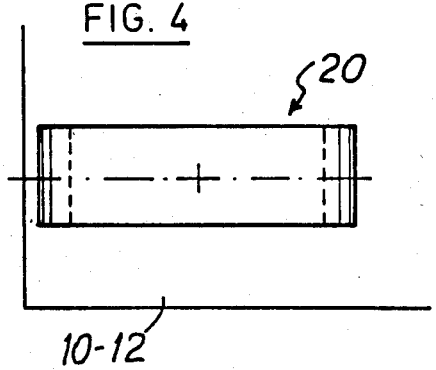
FIG. 4 is a plan view of an elastic ring suspension element of the type disclosed in FIG. 1 with the machine and securing device removed.

FIG. 3 illustrates limited rolling movement of the ring 22 in response to stress applied to the machine in the direction of the arrow in FIG. 3. When the machine has a certain axis, it is preferred to mount one or more rings with the straight segments parallel to that axis so that any stress applied to the machine in the direction of the axis of the machine will result in limited rolling movement in the longitudinal direction of the straight segments of the flattened rings. Such limited rolling movement of the flattened rings damps motion of the machine in the direction of the straight segments and, due to the resilience of the elastic rings, lateral or vertical motions of the machine will also be damped. The suspension system can, therefore, generally be regarded as three-dimensional since it damps motion in three dimensions, irrespective of the amplitude or direction of the stress applied.

Figure 5:
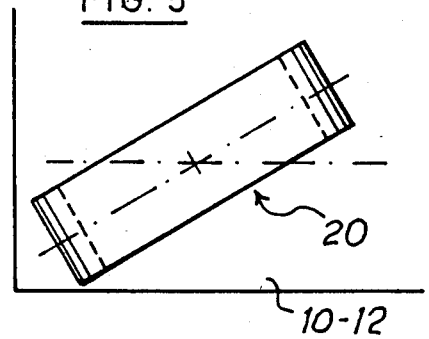
FIG. 5 is a plan view similar to FIG. 4 diagrammatically illustrating an elastic ring suspension element with the machine and securing device removed as in FIG. 4, oriented in an inclined direction relative to the axis of the machine.

It may be desired, depending upon the environment of the machine, to mount the elastic rings, as shown in FIG. 5, with the axis of a ring horizontal and the straight segments of the ring at an angle with respect to the direction of the axis of the machine being supported to damp motion produced by components of stress applied in the direction of the straight segments 21, 23.

Figure 6:
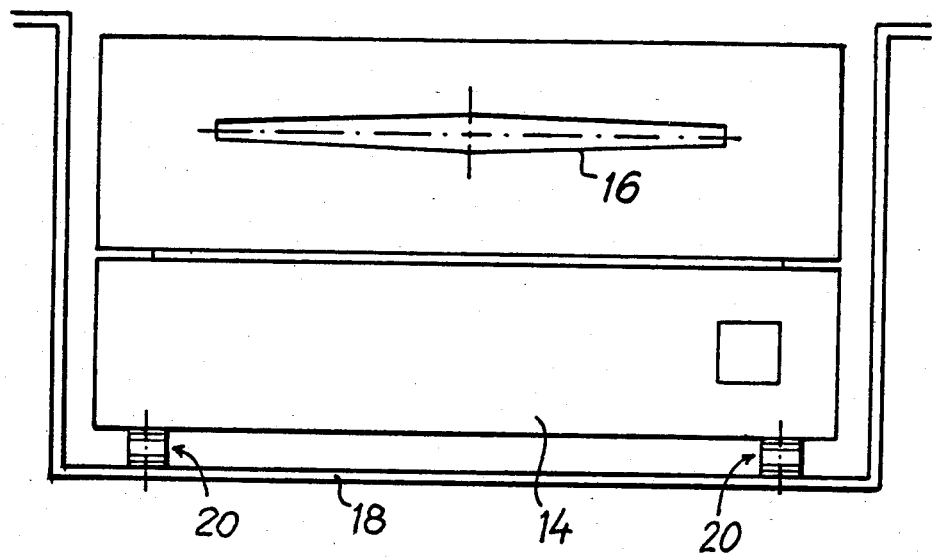
FIG. 6 is a front elevational view of a record playback machine illustrating the locations of motion damping ring assemblies carrying the machine on a support.
Figure 7:
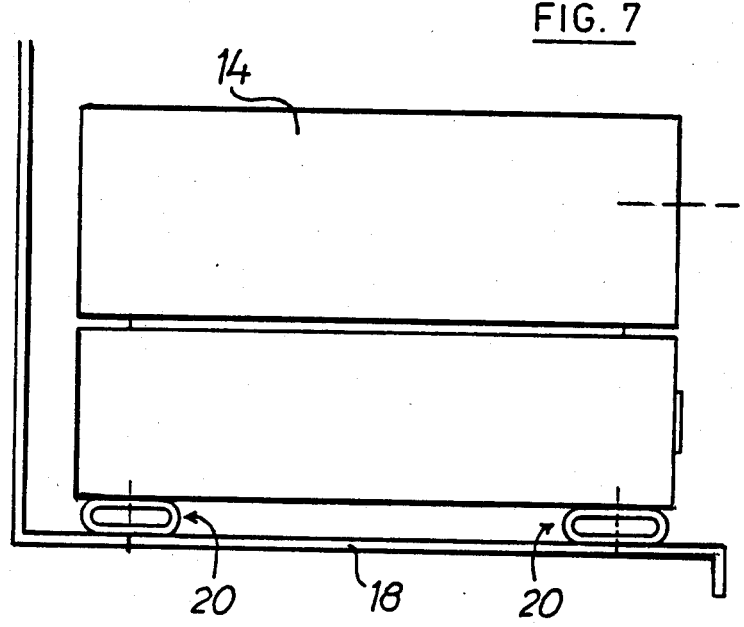
FIG. 7 is side elevational view of the record playback machine of FIG. 6 illustrating the locations of the motion damping ring assemblies.

Turning now to FIGS. 6 and 7, a playback machine 14 for compact discs is shown with a front insert slot 16. The playback machine is mounted on a support member 18 by means of a suspension system according to the invention.

Figure 10:
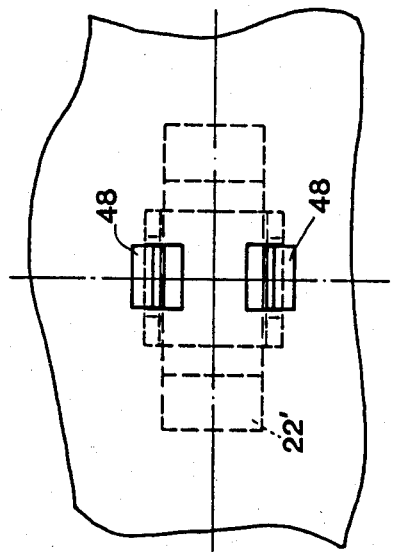
FIG. 10 is a plan view according to FIG. 8.
Figure 8:
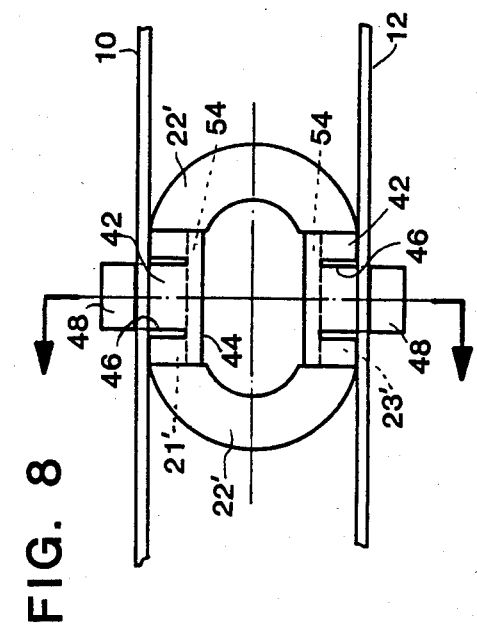
FIG. 8 is a side elevational view of a preferred embodiment of motion damping ring assembly including an elastic ring suspension element and mounting clips for securing the elastic ring to a support and a playback machine.
Figure 9:
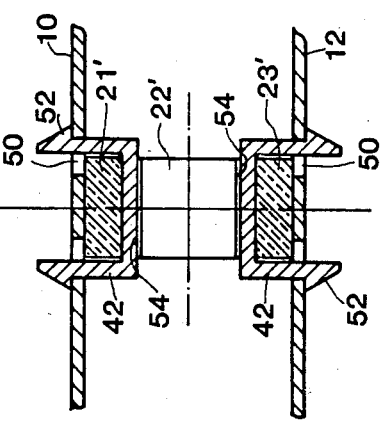
FIG. 9 is a sectional view taken substantially in the plane of lines 9—9 of FIG. 8.

Now turning to FIGS. 8–10, a chassis member 10 is shown of a machine, such as a record playback machine, mounted on a support member 12, which may be fixed to a vehicle chassis. According to the invention, a suspension system is provided for mounting the record playback machine employing a preferred embodiment of damping ring assembly. The damping ring assembly in this case includes a ring 22' of elastic material and a pair of mounting clips 42 adapted to fit around opposite segments 21', 23' of the ring 22. The mounting clips 42 each have a straight body portion 44 with a U-shaped cross-section (FIG. 9). The central section 16 of the body portion 44 of each clip has arms 48 constructed to project through an opening 50 in a support member or a machine member and interengage with, as shown in FIG. 9, edges of the opening 50 to secure the mounting clips 42 between the machine and the support. It is preferred that the mounting clips 42 be flexible, and they may be made of metal or plastic, so that the arms 48 may be squeezed toward each other for insertion through the opening 50 in a support or a machine. The arms 48 have heads 52 which project laterally from the edges of the opening to secure the clips 42 in position. A safety screw may be added to secure each clip.

In the preferred embodiment of damping ring assembly shown in FIGS. 8–10, the inner edges of the opposite segments 21', 23' of each ring 22' are formed with a recess 54 to receive the body portion 44 of the mounting clip 42.

In a suspension system according to the invention, it is preferred to have a plurality of motion damping ring assemblies mounted between the machine and the support. As shown in FIGS. 6 and 7, four motion damping ring assemblies are utilized with one under each of the four corners of the machine.

The upward stress applied by a motion damping ring assembly of a suspension system to sustain the weight of a machine is adjustable by varying the length of the clips 42 cooperating with the recesses 54 to take care of weight variations between the four corners of a machine. In a sample damping ring assembly having the construction and dimensions set out in the following table, it was found that the length of the clip 42 can be varied from 10 to 11 mms to adjust the stress applied, with the shorter clips providing a more flexible assembly. With longer clips, the assembly exerts greater stress to support a larger load or weight. In a physical embodiment of a suspension system according to the invention, four damping ring assemblies, having the construction and dimensions given in the following table, were employed under the four corners of a record playback machine having a weight of about 1.2 kg.

| Damping Ring Assembly | | |
| --- | --- | --- |
| Elastic Ring: | outer diameter = | 21 mms |
|  | inner diameter = | 13.4 mms |
|  | width = | 8 mms |
| Recess: | inner diameter = | 13.6 mms |
|  | 70° arc of circle | |
| Elastic Ring Material: | Butyl | 36–47 |
|  | Hardness, Shore | |
|  | Tensile Strength | 12 n/mm$^2$ |
|  | Elongation at Break | 500% |
|  | Compression Set | 15% for 3 days at 70° C. |
| Clip: | metal or injection molded plastic (Delrin) | |

I claim:

1. A motion damping suspension system for mounting a machine, such as a record playback machine, vertically above a movable support comprising:

movable support members providing substantially flat, horizontal supporting surfaces;

machine mounting members providing substantially flat mounting surfaces substantially parallel to and above said supporting surfaces;

a plurality of elastic rings secured between said machine mounting surfaces and said support supporting surfaces with said elastic rings in flattened condition between said surfaces and the axis of each ring arranged substantially horizontally and opposite segments of each ring adjacent said mounting and supporting surfaces extending substantially horizontally;

means for securing a portion of one of said horizontally extending segments of each ring to the machine and a portion of the other of said horizontally extending segments of each ring to the support to support the weight of the machine by compressing vertically extending segments of each ring such that stress applied to the machine having a component in the direction of the horizontal segments of a flattened ring produces limited rolling movement of said horizontally extending segments of the flattened ring along said mounting surfaces and said supporting surfaces which damps motion of the machine;

said flattened ring also damping motion of the machine vertically and laterally relative to said direction.

2. A system according to claim 1 wherein the axes of said plurality of elastic rings are parallel to each other.

3. A system according to claim 1 wherein a plate and a fastener are provided for securing each of the opposite segments of a ring to a machine or a support.

4. A system according to claim 1 wherein a mounting clip is provided for securing each of the segments of a ring to a machine or a support.

5. A system according to claim 1 wherein a mounting clip is provided for securing each of the vertically opposite segments of a ring to a machine or a support, said mounting clip having an elongated, substantially straight portion adapted to fit around one of said vertically opposite segments of a ring and hold said segment against a mounting surface of a machine or a supporting surface of a support, said mounting clip having flexible hooked arms bendable toward each other to fit through an opening in a machine or a support and to spring back and interengage with edges of the opening to secure the ring.

6. A damping ring assembly for mounting a playback machine on a support comprising:

a ring of elastic material;

a pair of mounting clips adapted to fit around opposite segments of said ring;

said mounting clips each having a straight body portion with a U-shaped cross-section, the body portion having flexible hooked arms bendable toward each other and squeezing the associated ring to fit through an opening in a support or a machine and to spring back and be restored by their resilience and interengage with edges of said opening to secure the mounting clip and ring between the machine and support.

7. A damping ring assembly according to claim 6 wherein said straight body portion of a clip includes end sections for engaging an adjacent face of a support or a machine and a central section having said hooked arms.

8. A system according to claim 1 for a machine having a certain longitudinal axis and said plurality of rings are provided for mounting with the horizontally extending segments thereof extending at an angle inclined to said longitudinal axis of said machine to damp motion of said machine caused by stress applied in the direction of the horizontally extending segments.

* * * * *